United States Patent
Karlsson et al.

[19]

[11] Patent Number: 5,947,660
[45] Date of Patent: Sep. 7, 1999

[54] TOOL FOR CUTTING MACHINING

[75] Inventors: Ronny Karlsson, Valdemarsvik; Johnny Bruhn, Norberg, both of Sweden

[73] Assignee: Seco Tools AB, Fagersta, Sweden

[21] Appl. No.: 08/945,908

[22] PCT Filed: May 3, 1996

[86] PCT No.: PCT/SE96/00581

§ 371 Date: Feb. 6, 1998

§ 102(e) Date: Feb. 6, 1998

[87] PCT Pub. No.: WO96/34714

PCT Pub. Date: Nov. 7, 1996

[30] Foreign Application Priority Data

May 4, 1995 [SE] Sweden .................................. 9501687

[51] Int. Cl.[6] .................................................. B23B 51/00
[52] U.S. Cl. ........................ 408/230; 408/233; 408/713
[58] Field of Search ................................. 408/231, 233, 408/713, 230; 403/22, 315, 316

[56] References Cited

U.S. PATENT DOCUMENTS

| | | |
|---|---|---|
| 4,684,298 | 8/1987 | Roos . |
| 4,728,231 | 3/1988 | Kunimori et al. ...................... 408/230 |
| 4,950,108 | 8/1990 | Roos ....................................... 408/230 |
| 5,399,051 | 3/1995 | Aken et al. ............................. 408/230 |
| 5,800,101 | 9/1998 | Jindai et al. ........................... 408/230 |

FOREIGN PATENT DOCUMENTS

| | | |
|---|---|---|
| 0 175 011 | 3/1986 | European Pat. Off. . |
| 0175011 | 3/1986 | European Pat. Off. .............. 408/231 |
| 0 358 901 | 3/1990 | European Pat. Off. . |
| 2533495A1 | 1/1977 | Germany ............................... 408/233 |
| 175 6033 | 8/1992 | U.S.S.R. . |
| 1 233 953 | 6/1971 | United Kingdom . |

*Primary Examiner*—Daniel W. Howell
*Assistant Examiner*—Monica Smith
*Attorney, Agent, or Firm*—Burns, Doane, Swecker & Mathis, L.L.P.

[57] ABSTRACT

A tool for cutting machining comprises a tool body, a cutting member and a fastener for fastening the cutting member to the tool body. The tool body has a shank, a central bore formed therethrough, and a front surface having grooves formed therein. The cutting member includes a cemented carbide body having a cutting edge formed in a front surface thereof, and a rear supporting surface. The supporting surface includes ridges received in the grooves, and a rearwardly open blind hole. The fastener extends through the central bore and is threadedly connected to the blind threadedly connected to the blind bore for pulling the cutting member against the tool body.

6 Claims, 6 Drawing Sheets

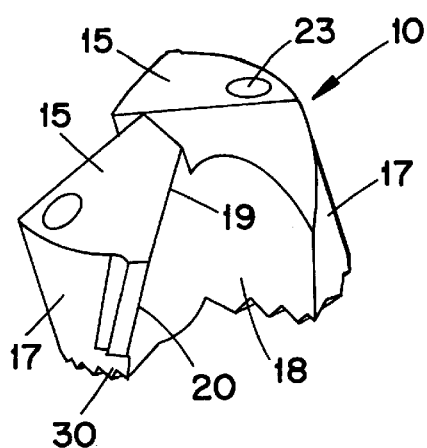
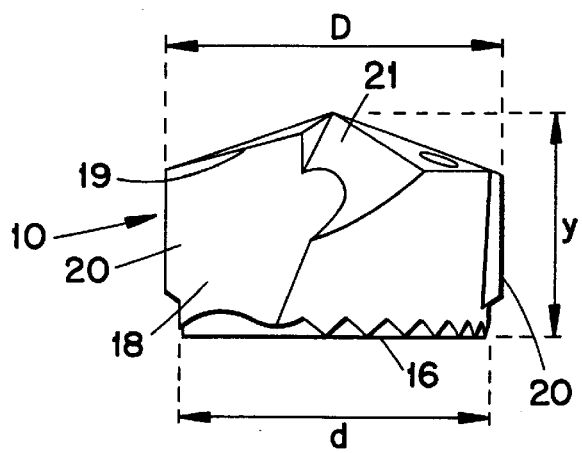
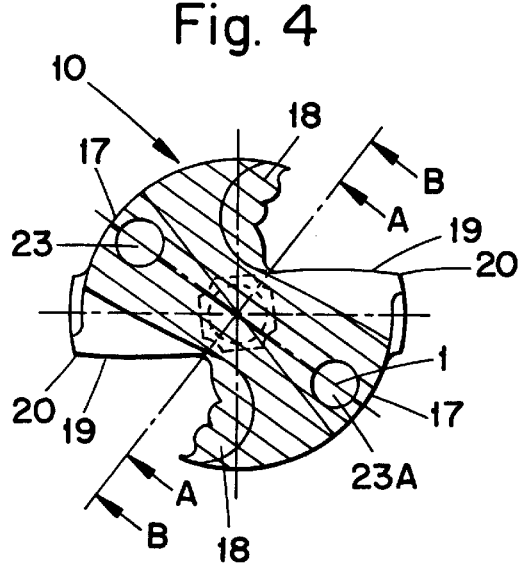
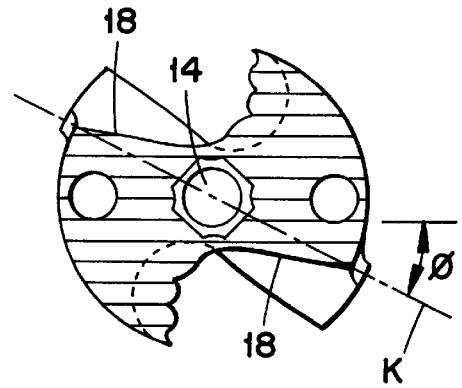
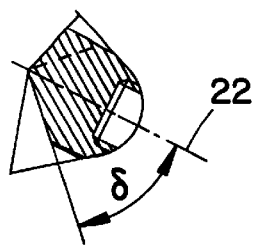
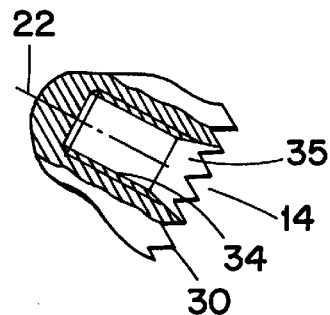

TOOL FOR CUTTING MACHINING

TECHNICAL BACKGROUND

The present invention relates to a tool for rotary, cutting machining, including a tool body, a cutting portion and means for fastening. The tool body has a front surface and the cutting portion has a support surface provided to dismountably abut against each other, substantially in a radial plane. The invention also relates to a separate tool tip, a cutting portion, a tool body as well as to a method for manufacturing a tool tip or a cutting portion.

It is previously known to use interchangeable cutting edges on different types of tools for cutting machining. This technique has however its practical limitation because of strength reasons when it comes to milling- and drilling tools rotating around its longitudinal axis.

Through U.S. Pat. No. 4,684,298 is previously known a drill with a dismountable cutting portion secured in a drill body by two screws, which are provided opposite sides of a central line of the drill. In the known drill, screws transfer torsion which is created during drilling, to the drill body. Such a drill suffers from a number of drawbacks, partly that it becomes statically unstable, which is solved by positioning resilient sleeves around the screws, and partly that the cutting portion is forced to contain less amount of cemented carbide (since the screws need space) whereby the propensity for crack formation increases. In addition the screws are submitted to shear forces and exchange of the cutting portion becomes troublesome.

Furthermore, it is previously known through European Document 0 358 901 to provide a drill with a dismountable cutting portion secured in a drill body by means of at least one screw, which is eccentrically positioned relative to the rotational axis of the drill. The cutting portion carries two indexable cutting inserts, and a pilot drill extends centrally therethrough. This known drill has the same drawbacks as mentioned above.

OBJECTS OF THE INVENTION

The present invention has as one object to provide milling or drilling tools with interchangeable cutting edges, which eliminates the problems of prior art tools.

Another object of the present invention is to provide a rigid tool, preferably for drilling or milling, where the cutting portion wedgingly cooperates with the tool body such that the clamping force increases with increasing feed force.

Another object of the present invention is to provide a tool, preferably for drilling or milling, where the cutting portion is firmly held by a central fastening means.

Another object of the present invention is to provide a rigid tool, preferably for drilling or milling, where the cutting portion easily can be exchanged.

Another object of the present invention is to provide a tool and a cutting portion where the advantage with grooves is combined with the production of injection molded cemented carbide.

Still another object of the present invention is to provide a tool and a cutting portion in which the cutting portion can not be positioned obliquely even if one of the cooperating grooved surfaces is worn.

Still another object of the present invention is to provide a tool and a cutting portion where axial or tangential cutting forces are distributed on a large surface such that the risk for breaking the cutting portion, is reduced.

Still another object of the present invention is to provide a tool and a cutting portion where the relative movement between the cutting portion and the tool body is negligible even after wear of the tool body.

Still another method object of the present invention is to provide a method for manufacturing a cutting portion or tool tip whereby the degree of freedom for geometrical appearance is substantially unlimited.

These and other objects have been achieved by a tool comprised of a tool body, a cutting member, and a fastener for securing the cutting member to the tool body. The tool body defines a longitudinal axis and includes a shank terminating in a front surface. The cutting member is formed of cemented carbide and has a cutting edge on a forwardly facing surface thereof. A rearwardly facing support surface of the cutting member includes a screw-threaded blind hole. The support surface and front surface include mutually engaging grooves and ridges. The fastener extends through the tool body and is screw threaded in the blind hole for pulling the cutting member toward the tool body.

The invention also relates to the cutting member per se, and to the tool body per se.

DESCRIPTION OF THE DRAWINGS

FIG. 2 shows a cutting portion according to the present invention in a perspective view;

FIG. 3 shows the cutting portion in a side view;

FIG. 4 shows the cutting portion in a top view;

FIG. 5 shows the cutting portion in a bottom view;

FIGS. 6 and 7 show cross sections according to lines A—A and B—B in FIG. 4;

DETAILED DESCRIPTION OF PREFERRED EMBODIMENTS OF THE INVENTION

Figure 1:
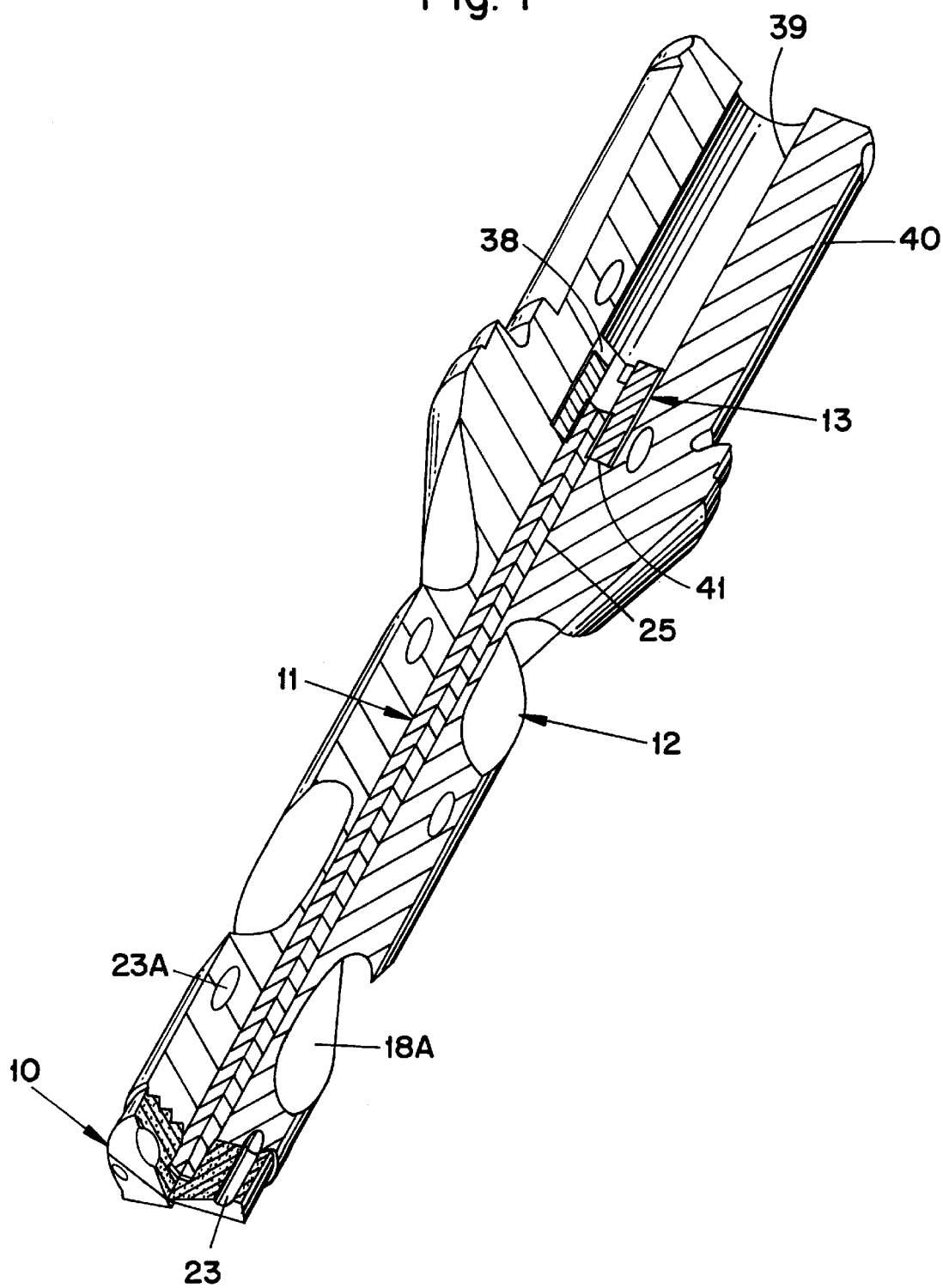
FIG. 1 shows a drilling tool according to the present invention, in a partly sectioned, perspective view.

The embodiment of a tool according to the invention shown in FIG. 1 is a so called helix drill, which comprises a tool tip or a cutting portion 10, a pull rod 11, a drill body 12 and a retainer nut 13.

The cutting portion 10 is provided with at least one cutting edge 19 at the end facing away from the drill body 12, which edge is given a configuration depending on the area of application. Alternatively, the cutting edge would be (or the cutting edges would be) substantially straight and parallel to the longitudinal center axis of the cutting portion if the tool were an end mill, while the cutting edges would be circular if the tool were a ball nose end mill. The forward end of the depicted cutting portion 10 shows an edge 19 for drilling. The appearance and the area of application of the tool may vary in several ways.

The cutting portion 10 is made of hard material, preferably cemented carbide and most preferably of injection molded cemented carbide and comprises two upper clearance surfaces 15, a support surface 16, a pair of curved first surfaces 17 and a pair of curved second surfaces 18. The surfaces 17, 18 connect the support surface 16 with the clearance surfaces 15. All these surfaces and resulting edges are made of the same material, i.e., preferably of injection molded cemented carbide. Lines of intersection between the second curved surfaces or the chip flutes 18 and the clearance surfaces 15 form the main cutting edges 19, preferably via reinforcing chamfers, not shown. Lines of intersection between the first curved the surfaces 17 and the chip flutes 18 form secondary cutting edges 20. The chip flute can alternatively be adapted for a drill body with straight chip flutes. The cutting portion preferably also comprises a coring-out surface 21, which reaches the center of the cutting portion and which forms an angle δ, FIG. 6, with the rotational axis 22 of the tool. The angle δ lies within the interval of 40 to 50°, preferably 45°. The biggest diameter of the cutting portion is the diametrical distance D between the radial extreme points of the secondary cutting edges 20. The height Y of the cutting portion is substantially the same as the distance D, in order to minimize the wear from chips on the joint between the cutting portion and the drill body. The biggest diameter d of the support surface 16 is preferably less than diameter D, in order to obtain clearance at machining. Flushing holes 23, 23A, being substantially parallel with the rotational axis 22, extend through the cutting portion from the support surface 16 to the orifice in respective upper clearance surfaces 15. The flushing holes are provided on a common line 1 on each side of the axis 22.

Figure 8:
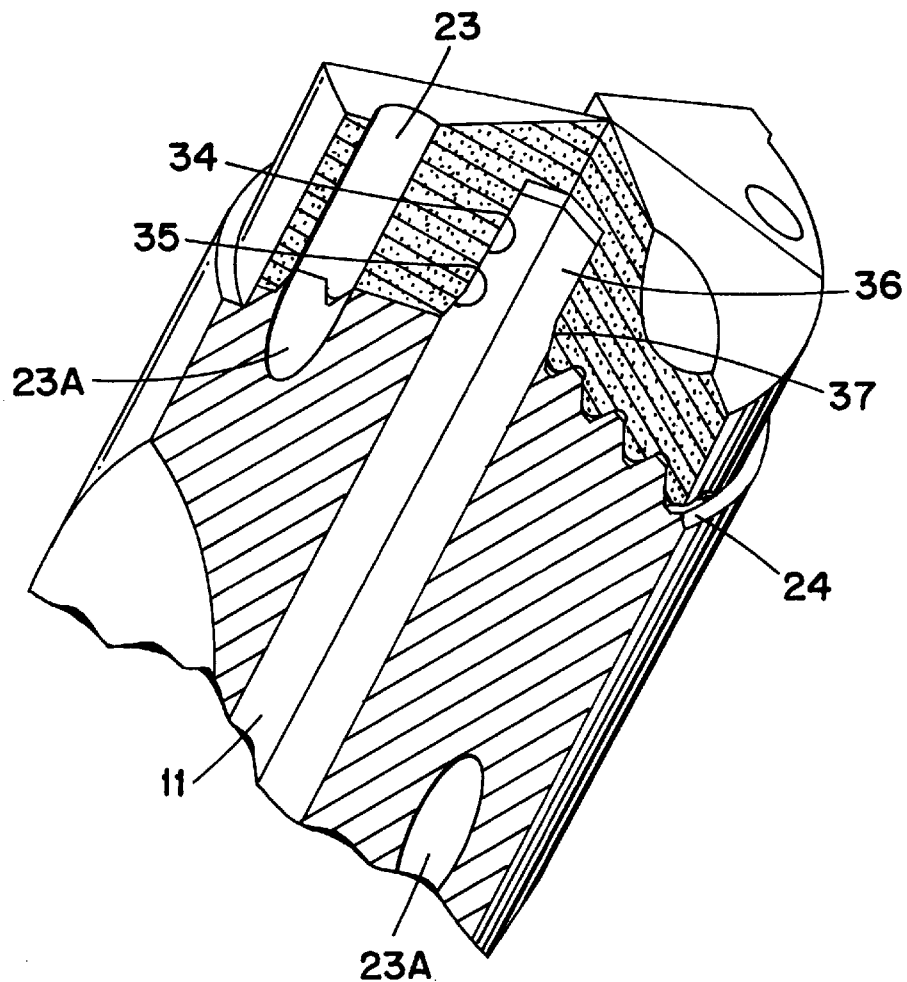
FIG. 8 shows the drill tip according to FIG. 1 in magnification.
Figure 10:
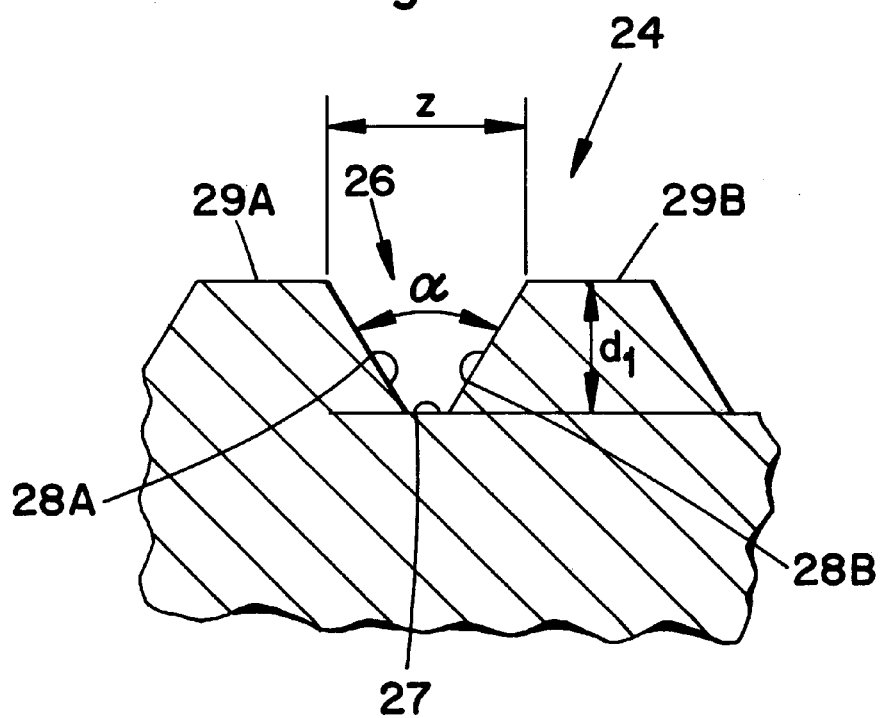

The support surface 16 is provided with a number of separate, substantially identical and parallel grooves or ridges 30. The ridges form a substantially sinusoidal curve in the cross section according to FIG. 8, which curve travels about a line which substantially lies in the plane of surfaces 29A, 29B, described below with reference to FIG. 10. The ridges are elongated. The ridge 30 further has two flanks 32A, 32B, which extend to the ridge bottom 31. The bottom can be described by a radius of about 0.2 to 0.4 mm. The flanks form an acute angle ε with each other. The angle ε lies within the interval of 40° to 80°, preferably between 55° and 60°. A crest or a curved surface 33A, 33B is provided on each side of the ridge 30. Each surface 33A, 33B touchingly connects to the associated flank via a soft transition, and joins with the other surface 33A, 33B at the tip of the ridge. Each ridge may be substantially parallel with the line 1 or form an acute angle with the line 1. Each ridge forms an angle φ with a line K, intersecting the radial extreme points of the chip flutes 18 on the side of the cutting edge in the support surface 16. The angle φ is about 0° to 90°, preferably 30° to 60°. The ridge has a height h and a largest width w. The number of ridges 30 depends indirectly on the diameter D of the cutting portion and the number of ridges varies between 2 to 20 and for example can be mentioned that about 9 ridges is provided on a drill of the diameter 18 mm.

The cutting portion is provided with the support surface 16 at the end facing the drill body 12, which surface 16 is provided with a first means for engagement 14, which in the shown embodiment comprises a threaded recess and a truncated, conical guiding surface 35.

An end of the pull rod 11 facing towards the cutting portion, is provided with an additional, externally threaded part 36, which is followed axially rearwards by a conical widening 37, which are intended to cooperate with the first means for engagement 14. In an operative situation the threaded recess 34 cooperates with the other threaded part 36.

In the other end of the pull rod 11 is provided a further external threaded part, which cooperates with a cylindrical nut 13 provided with a key grip 38. The nut is inserted in a boring 39 in the shank portion 40 of the drill body, wherein the nut and the shank portion include cooperating, radial contact surfaces at 41. The contact surface 41 gives axial support for the nut after tightening. The boring connects concentrically to a central, smaller channel 25 in the drill body, said channel extending forwards to and terminating centrally in the front surface 24 of the drill body. The drill body is provided with flush channels 23A, which follow protruding lands of the drill, along a helical path on substantially constant distance from the rotational axis 22. The drill body has screw shaped chip flutes 18A or straight chip flutes and these may extend through the body or through of a part thereof.

The drill body 12 is provided with a front surface 24 at the end facing towards the cutting portion 10, which surface is provided to abut against the support surface of the cutting portion 10. The largest diameter of the front surface is smaller than the largest diameter D of the cutting portion but preferably the same as the smallest diameter d of the cutting portion.

The front surface is provided with a number of separate, identical recesses or grooves 26, which in cross section describe a substantially trapezoidal path. The grooves are elongated and extend along essentially the entire front surface. Each groove may be substantially parallel with the line 1 or form an acute angle with the line 1. Each groove forms the angle φ with the line K, which intersects the radial extreme points of the chip flutes on the cutting edge side in the front surface 24. The angle 0 is about 0° to 90° and preferably 30° to 60°. Each groove 26 has two flanks 28A, 28B, which connect to the bottom 27, via a sharp or rounded transition. The flanks form an acute angle α with each other. The angle α lies within the interval of 40° to 80°, preferably 55° to 60°. A planar surface 29A, 29B is provided on each side of the groove 26. Each surface is preferably planar and connects to the associated flank via an obtuse inner, soft or sharp, transition. The number of grooves 26, which depends of how the support surface of the cutting portion is formed, is consequently the same as the number of ridges which the support surface has, the number being in the interval of 2 to 20 grooves. The groove has a depth d, and a largest width z. The bottom can alternatively be described by a radius of about 0.2 to 0.4 mm.

The height of the ridge is 50% to 95% of the groove 26 depth and the largest width w of the ridge is bigger than the biggest width z of the groove. This results in a gap p between the crest 33A and the bottom 27 when mounting the cutting insert in the holder. The gap ensures that the flanks engage with each other and that the bottom does not support the cutting insert, and therefore tilting is avoided. A corresponding gap arises also above the planar surfaces 29A, 29B. The ridges and the grooves form, in mounted condition, a joint with a number of wedgingly effective connections which entail an increase in the frictional force with increasing feed force. Another advantage with said wedging effect is that it allows a certain oblique positioning of the ridges and the groove relative to each other in connection with the initial stage of mounting, wherein these are guided correctly by its geometry during continuing compression. The joint is placed such that it usually will be situated in the drill hole during the drilling. The ridges and the grooves should be placed on respective surfaces such that the result will be as many long ridges and grooves as possible. The ends of a ridge or a groove should be as far from each other as possible for best moment transfer.

Mounting of the cutting portion 10 on the drill body 12 takes place as follows. The pull rod is brought into in the boring 39 and through the central hole 25 of the drill body 12 until nut 13, which is connected to the axially rear end of the pull rod, abuts against the contact surface 41. The forward part 36 of the pull rod and the conical widening 37 thereby project centrally from the front surface 24. Then the threaded part 36 is brought into in the recess 14 and the cutting portion is rotated and is threaded onto the pull rod until the surfaces 35 and 37 abut against each other. Then the support surface 16 of the cutting portion is brought by hand into contact with the front surface. At rotation of the nut 13 via a key which is in engagement with the key grip 38, the cutting portion 10 is drawn firmly against the front surface, i.e. the position according to FIG. 1 has been achieved. The cutting portion 10 is now anchored in a satisfactorily manner in the drill body 12. The pull rod is in this position substantially intended to retain the cutting portion during extraction of the tool from the machined hole, i.e. the pull rod transfers the feed forces substantially alone, while the ridges and the grooves receive the forces and momentum which are created by the cutting machining. However, the force from the pull rod is large enough on the joint between the cutting portion and the body to avoid loose fit at extraction. The ridges and the grooves intersect the chip flutes 18, 18A in a essentially common radial segment or radial plane and the chip flutes extend axially on both sides if said radial segment.

In this connection shall be pointed out that the threaded connection between the cutting portion and the pull rod serves two purposes, namely to place the cutting portion 10 in a fixed position in the drill body at mounting, and to ensure that the cutting portion 10 during use of the cutting tool, is always retrained in its fixed position.

By the cooperating ridges and grooves an interaction of the forces at each contact surface or line of contact can be derived, where cooperation of the flanks takes place, according to $$T'=P/n[\sin(\alpha/2)/\mu - \cos(\alpha/2)]$$

where T' is the shear force acting on one flank 28A or 28B of n number of grooves, $\mu$ is the coefficient of friction and P is the resultant force which arises from the feed. From the formula one can see that a smaller flank angle gives a higher shear force T' which counteracts "cogging over" caused by the drilling moment. A drill according to the present invention becomes statically stable and contains much cemented carbide as well as unloading the pull rod both radially and axially.

Figure 11:
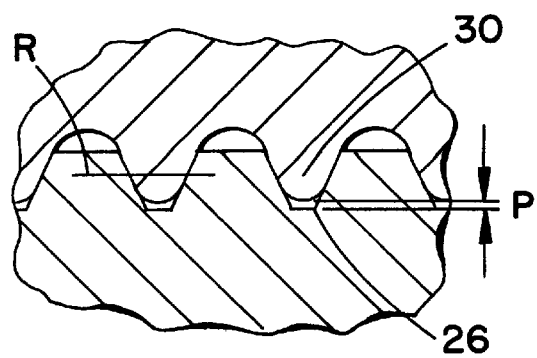
Figure 9:
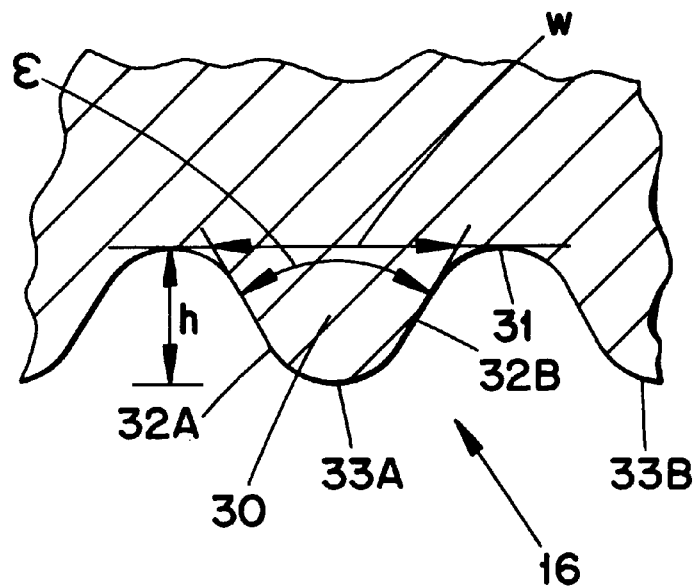
FIGS. 9, 10 and, 11 show enlarged cross sections of cooperating support surfaces in FIG. 8.

By spreading the cutting forces on a larger surface the risk for splitting the support surface 16 of the cutting portion is diminished. After the mounting, the ridges 30 and the grooves 26 will have contact surfaces, which intersect the radial plane R, FIG. 11, a number of times, preferably at least four times, at locations radially outside the end 36 of the pull rod. The contact surfaces of the ridges and of the grooves lie substantially in the radial plane R, i.e. they oscillate about the radial plane R with an amplitude which is at maximum half the height h of the profile. The height of the profile is maximum 20% of the cutting portion height Y. The total contact surface becomes 5 to 10% larger than conventional planar contact surfaces. The cutting portion 10 can thus be removed from the front surface 24 when the pull rod 11 end 36 is unscrewed, i.e. is moved from a first axially forward position to a second axially rearward position.

Then, the cutting portion 10 can be removed from the drill body 12 and be exchanged.

Figure 12:
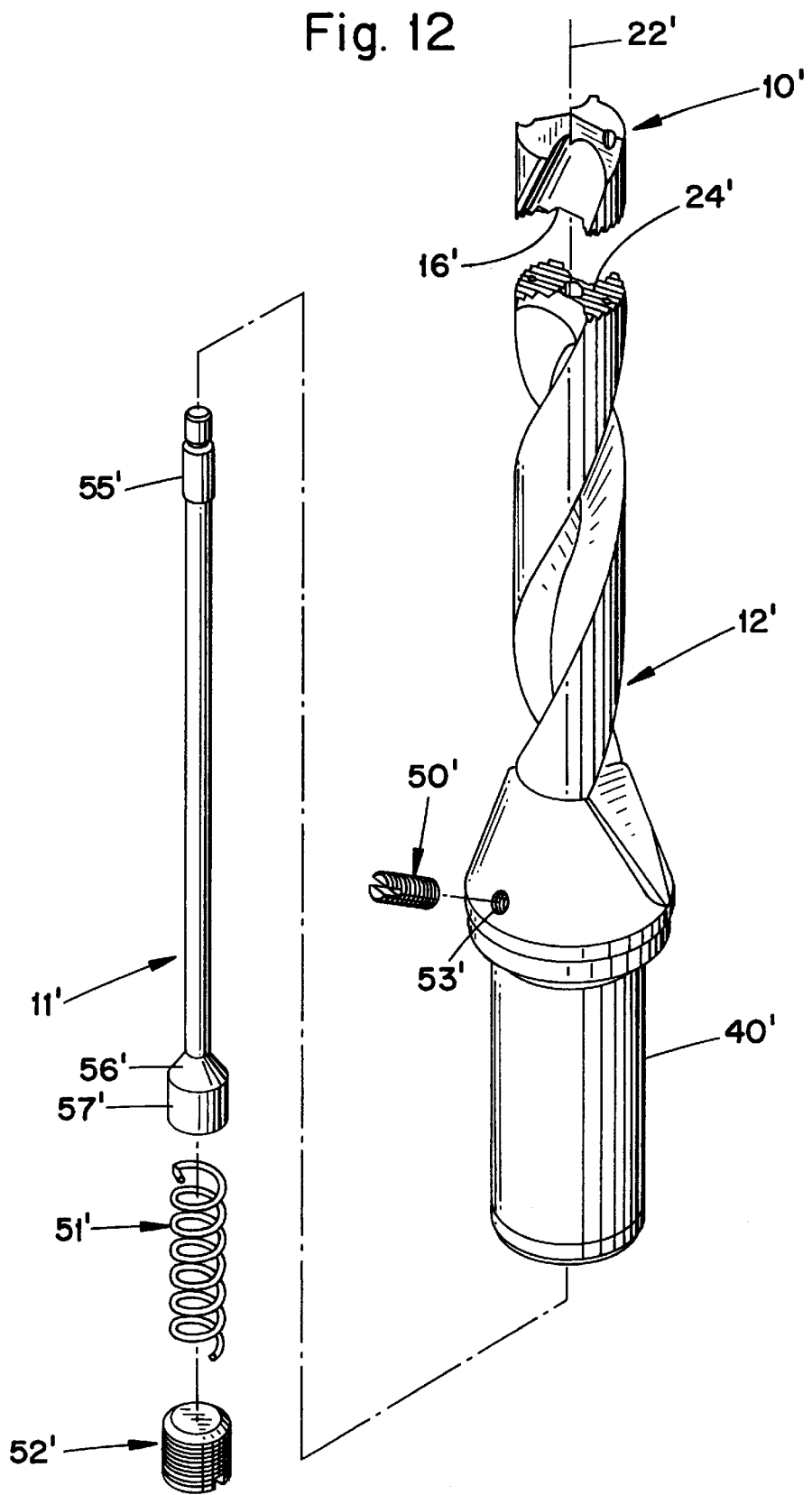
FIGS. 12 and 13 show an alternative embodiment of a tool according to the invention.
Figure 13:
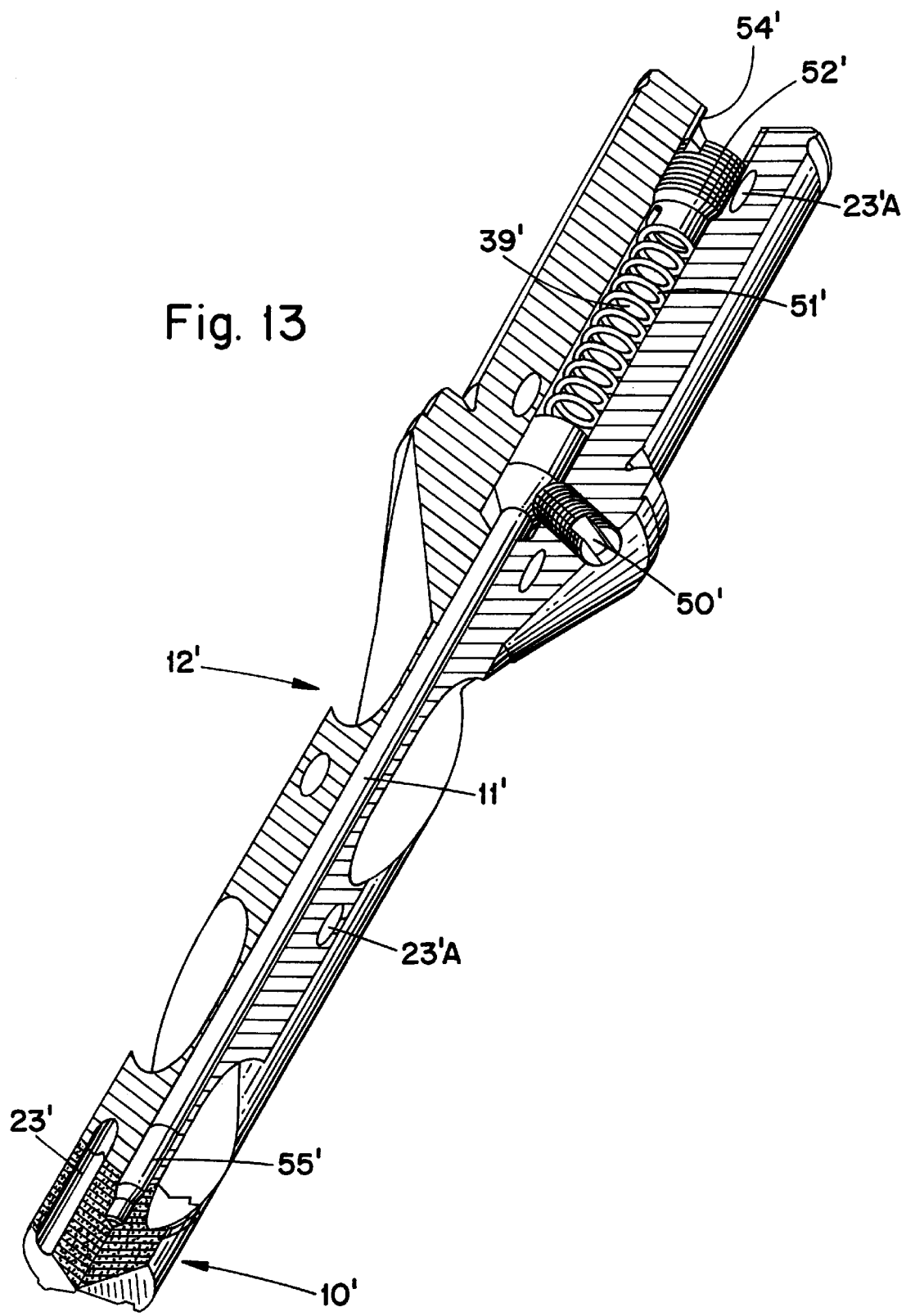

In FIGS. 12 and 13 there is shown an alternative embodiment of a tool according to the invention, which comprises a tool tip or a cutting portion 10', a pull rod 11', a drill body 12', an adjustment screw 50', a spring 51' and a retainer stop screw 52'. With this tool it is possible to unload and exchange the cutting portion while the drill body is fixed in the machine.

The cutting portion 10' and the drill body 12' are substantially identical to the ones described above. However the drill body has an obliquely inwardly and rearwardly directed, threaded boring 53', in the transition between the securing end and the chip flutes, and an axially rearwards thread 54' in the boring 39'.

The axially forward end of the pull rod 11' comprises a concentrically widened guiding surface 55' and parts 36' and 37' corresponding to the earlier described parts 36, 37. The axially rearward end of the pull rod has a conical widening 56', which passes rearwardly into a cylindrical guiding surface 57', wherein the diameter of said guiding surface is somewhat less than the diameter of the boring 39'.

The drilling tool is mounted by bringing the pull rod into the boring 39' and through the central hole of the drill body 12'. Then the spring 51' is inserted into the boring 39', whereafter the external threaded stop screw 52' is screwed into the thread 54', and thereby the spring is compressed and forces the pull rod ahead to a stop. The pull rod thereby assumes an axially forward position, and the threads in the cutting portion and on the pull rod can cooperate. Also, the cutting portion can be screwed firmly onto the pull rod, whereafter the adjustment screw 50' via the thread 53' can press against the widening 56' and push the pull rod rearwardly. Exchange of the cutting portion takes place as follows. The adjustment screw 50' is first unloaded on the side of the drill shank, and the pull rod 11' is pushed ahead, about 2 mm, due to the stored elastic energy in the spring 51'. The spent cutting portion is unscrewed, preferably by hand, and a new cutting portion is threaded firmly on the pull rod until the conical part of the recess abuts against the forward conical part of the pull rod. Then one can continue in two different ways. Either the cutting portion is brought against the front surface of the drill body by hand, such that the ridges and the grooves come into engagement with each other, whereafter the adjustment screw 50' is tightened and the cutting portion is thereby fixed in operative position. The other way is to let the screw 50' itself push the pull rod and the cutting portion rearwardly such that the ridges and the grooves come into engagement with each other, such that the cutting portion is fixed in operative position. The conical surface 56' can abut against a corresponding surface in the forward end of the boring 39' when the screw 50' is unscrewed. Thereby the friction between the conical surfaces counteracts rotation of the pull rod during unscrewing of the cutting portion. If friction is too low the screw 50' can be screwed towards the cylindrical surface 56' and thus further lock the pull rod against rotation.

In both of the above described embodiments the cutting portion has a wedging cooperation with the tool body, such that the clamping force or the frictional force, i.e. the resistance against radial displacement of the portion relative to the body, increases with increasing feed force. In addition, the means for fastening are provided to influence the cutting portion in the same direction as the feed force during drilling i.e., the pull rod draws the cutting portion axially rearwardly substantially in the same direction in which the feed force acts.

It is understood that the geometries of the cooperating ridges and grooves can be varied within the spirit of the present invention without departing from the scope of the claims. Consequently the geometries can assume most thread cross sections (however with a degree of overlap of max 95%), trapezoidal on both cooperating the surfaces, for example. The invention could be used also for milling cutters. The cutting portion is preferably coated with layers of for example $Al_2O_3$, TiN and/or TiCN. In certain cases it can be advantageous with brazed on super hard materials such as CBN or PCD on the cutting edges.

Likewise, it is possible to utilize other clamping means than a central pull rod; for example it is possible to maintain the cutting portion by a wedge, movable perpendicularly to the rotational axis.

Furthermore shall be pointed out that the above described embodiments relate to tools which rotate relative to its longitudinal axis or to the center axis of the workplace and that the means for retention rotates with the tool. The tools can be used also as stationary tools in combination with a rotary work piece.

An aspect of the invention relates to a tool tip, which in its entirety consists of hard material such as injection molded cemented carbide, wherein it is possible to apply the invention to turning, milling, drilling or broaching inserts for metal machining or on cutting or percussive inserts for rock drilling or mineral milling. At utilization of the invention for metal machining, the tool tip or the cutting insert comprises a central blind hole for receiving a fastening device, wherein the recess has a thread 34 integral with the cutting insert. By that is intended that cutting inserts can be clamped from the lower side thereof by for example a screw, such that a large upper surface becomes amenable for cutting edges or chip formers, which earlier were not possible to use. The thread is then chosen such that it does not become loose during machining.

The tool tip or the cutting portion is made as follows. Cemented carbide and a bearer, plastics for example, is mixed and is shaped to pellets or granulate whereafter the mixture is inserted in a molding machine after preheating to a suitable temperature for the mixture, whereafter the mixture under high pressure and high temperature, about 180° C., is injected into an accurately shaped mould arranged with a certain configuration, corresponding to the design of the cutting portion or of the tool tip. The mould therefore contains parts in order to directly or indirectly create prerequisites for at least one cutting edge, at least one clearance surface and a non-planar support surface and one or more cores for threads and flush channels, with the intention to convey the design to the cutting portion or the tool tip, whereafter the injection molded cemented carbide portion or tip may solidify in the mould and is subsequently is plucked out. The tip or portion is then sintered and possibly machining can be performed, such as grinding of the clearance surfaces. With the aid of this method the geometry of the portion or of the tip can be chosen regardless of the limitations of the conventional method for injection molding. For example, chip breakers can be shaped on surfaces which until now only been able to be ground.

The invention is in no way limited to the above described embodiments but can be varied freely within the scope of the appended claims.

We claim:

1. A tool for rotary cutting machining, comprising:
   a tool body defining a longitudinal axis and including a shank terminating in a front surface;
   a cutting member formed of cemented carbide, said cutting member having a cutting edge on a forwardly facing surface thereof, and including a rearwardly facing support surface engaging said front surface of said tool body, said support surface including a rearwardly open blind hole;
   said support surface and said front surface including mutually engaging projections and recesses, said projections comprising parallel and linear ridges, and said recesses comprising parallel and linear grooves receiving respective ones of said ridges;
   a fastener disposed partly in said tool body and partly in said blind hole and exerting an axially rearward force on said cutting member for pressing said support surface of said cutting member against said front surface of said tool body, said fastener extending axially in said tool body, and said blind hole being axially aligned with said fastener; and
   flush channels formed in said tool body and in said cutting member and aligned with one another, said flush channels extending through said ridges and said grooves of conducting flushing fluid through said tool body and to said cutting edge.

2. The tool according to claim 1 wherein said blind hole includes female screw threads, and said fastener includes male screw threads coupled to said female screw threads.

3. The tool according to claim 1 wherein the grooves include bottoms, and the ridges include crests, said crests spaced axially from said bottoms to form a gap therebetween.

4. The tool according to claim 1 wherein said tool body includes a bore extending along said axis, said fastener disposed within said bore and having a screw-threaded front end projecting forwardly past said front surface of said tool body, said blind hole being screw threaded to said fastener, and a retainer for retaining the fastener in the tool body.

5. A tool for rotary cutting machining, comprising:
   a tool body defining a longitudinal axis and including a shank terminating in a front surface;
   a cutting member formed of cemented carbide, said cutting member having a cutting edge on a forwardly facing surface thereof, and including a rearwardly facing support surface engaging said front surface of said tool body, said support surface including a rearwardly open blind hole;
   said support surface and said front surface including mutually engaging projections and recesses, said projections comprising parallel linear ridges, and said recesses comprising parallel linear grooves receiving respective ones of said ridges, said grooves including bottoms, and the ridges including crests, said crests spaced axially from said bottoms to form a gap therebetween, said ridges defining a substantially sinusoidal curve, and said grooves defining a substantially trapezoidal curve, an axial height of each ridge being 50 to 95 percent of an axial depth d of said groove; and a fastener disposed in said tool body and said blind hole for pressing said tool body and said cutting member toward one another.

6. The tool according to claim 5 wherein a number of said grooves equals a number of said ridges, said number being from 2 to 20.

* * * * *